United States Patent
Fang et al.

(10) Patent No.: US 11,908,207 B2
(45) Date of Patent: Feb. 20, 2024

(54) METHOD FOR DETECTING ROAD DISEASES BY INTELLIGENT CRUISE VIA UNMANNED AERIAL VEHICLE, UNMANNED AERIAL VEHICLE AND DETECTING SYSTEM THEREFOR

(71) Applicants: BeSTDR Infrastructure Hospital(Pingyu), Henan (CN); SAFEKEY Engineering Technology (Zhengzhou), Ltd., Henan (CN)

(72) Inventors: Hongyuan Fang, Henan (CN); Niannian Wang, Henan (CN); Duo Ma, Henan (CN); Juan Zhang, Henan (CN); Jiaxiu Dong, Henan (CN); Binghan Xue, Henan (CN); Haobang Hu, Henan (CN); Jianwei Lei, Henan (CN)

(73) Assignees: BeSTDR Infrastructure Hospital (Pingyu), Henan (CN); SAFEKEY Engineering Technology (Zhengzhou), Ltd., Henan (CN)

( * ) Notice: Subject to any disclaimer, the term of this patent is extended or adjusted under 35 U.S.C. 154(b) by 75 days.

(21) Appl. No.: 17/515,396

(22) Filed: Oct. 29, 2021

(65) Prior Publication Data
US 2022/0237928 A1 Jul. 28, 2022

(30) Foreign Application Priority Data
Nov. 2, 2020 (CN) .......................... 202011203793.9

(51) Int. Cl.
*G06V 20/56* (2022.01)
*G06V 20/17* (2022.01)
(Continued)

(52) U.S. Cl.
CPC .......... *G06V 20/588* (2022.01); *B64C 39/024* (2013.01); *G06V 20/17* (2022.01);
(Continued)

(58) Field of Classification Search
CPC .... G06V 20/588; G06V 20/17; G06V 20/176; G06V 10/98; G06V 20/182;
(Continued)

(56) References Cited

FOREIGN PATENT DOCUMENTS

| CN | 110910354 | * | 3/2000 |
| CN | 112326686 | * | 2/2021 |

* cited by examiner

*Primary Examiner* — Jerome Grant, II (57) ABSTRACT

A method for detecting road diseases by intelligent cruise via an unmanned aerial vehicle (UAV), the UAV and a detecting system therefor are provided. The method for detecting road diseases by intelligent cruise via UAV, wherein a road disease detection model and a road recognition model based on deep learning network are built in the UAV, wherein the method specifically comprises a step of: automatically flying the UAV on a predetermined route on the actual road determined by the road recognition model, and obtaining road disease test results by the road surface disease detection model. The present invention adopts the road recognition model and road disease detection model based on deep learning network, which can realize automatic cruise and automatic road disease detection, only need to set a predetermined route or area range, which is convenient and fast.

8 Claims, 7 Drawing Sheets

(51) Int. Cl.
    *G06V 20/10*         (2022.01)
    *B64C 39/02*         (2023.01)
    *B64U 10/13*         (2023.01)
    *B64U 101/30*       (2023.01)

(52) U.S. Cl.
    CPC ............ *G06V 20/176* (2022.01); *B64U 10/13* (2023.01); *B64U 2101/30* (2023.01); *B64U 2201/10* (2023.01)

(58) Field of Classification Search
    CPC ....... B64C 39/024; B64C 39/02; B64U 10/13; B64U 2101/30; B64U 2201/10; G01N 21/9515; G01N 21/8851; G01N 2021/8887; G01N 2021/9518; G06N 3/08; G06N 3/045
    USPC ........................................................ 382/103
    See application file for complete search history.

METHOD FOR DETECTING ROAD DISEASES BY INTELLIGENT CRUISE VIA UNMANNED AERIAL VEHICLE, UNMANNED AERIAL VEHICLE AND DETECTING SYSTEM THEREFOR

CROSS REFERENCE OF RELATED APPLICATION

The present application claims priority under 35 U.S.C. 119(a-d) to CN 202011203793.9, filed Nov. 2, 2020.

BACKGROUND OF THE PRESENT INVENTION

Field of Invention

The present invention relates to road disease detection, and more particular to a method for detecting road diseases by intelligent cruise via an unmanned aerial vehicle (UAV), the UAV and a detecting system therefor.

Description of Related Arts

Since 2016, the technical conditions of UAVs have been continuously improved and mature, and have been widely used in agriculture, engineering, military and other fields. The technological development of UAVs has become more and more eye-catching, and target tracking and intelligent control has become a hot field in the development of UAVs. This technology can further improve the safety, efficiency and automation of UAVs, and provide a strong guarantee for the intelligent detection tasks of UAVs.

The patent document with an application number 201911120174.0 discloses a method for locating road diseases based on UAVs. The method uses Beidou satellite positioning and navigation system to control UAVs, and recognizes and collects road disease images through an improved DPM model, so as to achieve UAV-based disease location detection. However, this method still requires manual control of the UAV, and it is impossible to make the UAV fly automatically through the method of planning routes or intelligent tracing. In addition, the DPM model is an algorithm that first calculates the histogram of the gradient direction, and then uses the support vector machine to train the disease detection algorithm.

Therefore, the conventional road detection technology has shortcomings and needs to be improved.

SUMMARY OF THE PRESENT INVENTION

In view of the shortcomings of the above conventional arts, an object of the present invention is to provide a method for detecting road diseases by intelligent cruise via an unmanned aerial vehicle (UAV), the UAV and a detecting system therefor, which can automatically fly according to a scheduled route, and detect the deployment disease.

In order to achieve the above object, the present invention provides the following technical solutions.

A method for detecting road diseases by intelligent cruise via an unmanned aerial vehicle (UAV), wherein a road disease detection model and a road recognition model based on deep learning network are built in the UAV, wherein the method specifically comprises steps of:

automatically flying the UAV on a predetermined route on the actual road determined by the road recognition model, and obtaining road disease test results by the road surface disease detection model.

Preferably, the depth learning-based UAV intelligent cruise road disease detecting method, before the detecting method is performed, the road image is used in the computer terminal, and the road surface disease image separately on the road recognition model, respectively the depth learning network base model of the road surface disease detection model is trained, and the optimal road recognition model is obtained, and the road surface disease detection model is loaded into the UAV.

Preferably, the predetermined route is pre-set by the server, the predetermined route is preset by the server; the UAV communication acquires the predetermined route data.

Preferably, the detection method based on deep learning-based UAV intelligent cruise road, the operation mode of the UAV includes intelligent equity, the specific steps:

getting an environmental image;
using the road recognition model to determine the road mark; and
getting a predetermined route, drive the UAV to fly along the road surface on the predetermined route.

Preferably, the detection method based on deeply learning-based UAV intelligent cruise road, the operation mode of the UAV includes a fixed point cruise, and the specific operation step is:

determining several key locations of the scheduled route;
sequentially passing a critical position by the UAV in accordance with the predetermined order.

A UAV, comprising a basic component, cameras, and detection boards; the camera, the detecting plate, is connected to the basic component; the detection board is loaded with a depth learning algorithm, a road surface disease detection model and road recognition. The model can achieve the road disease detection method.

Preferably, the UAV, the basic component comprises a rack, a motor, an electrical tone, a control board, a data transmission module, an image transmission module, an accelerometer, a positioning device, the electrical tone, the accelerometer, the positioning device is connected to the control board, and the detecting plate is connected to the frame; the motor is connected to the electrical connection; the camera is connected to the image transmission module, the image transmission module is connected to the detection board, respectively.

A road surface disease detection system uses the UAV, including interactive end and UAV, the UAV communication with the interactive end.

Preferably, the depth learning-based UAV intelligent cruise road disease detection system, the interactive end is a computer or mobile phone.

A readable medium, stores a computer software, the software to complete the detection method when executed by the processor.

Compared to the prior art, the UAV intelligent cruise road disease detection method, UAV and detection system provided by the present invention have the following benefits:

1. The present invention adopts the road recognition model of deep learning network and the road surface disease detection model, it is possible to realize automatic cruise and automatic road disease testing, only need to set a predetermined route or a predetermined regional range to achieve automatic cruise detection, convenient and fast;

2. The present invention has adopted a UAV as a core mobile device, and the UAV has a light, a wide range of moving ranges, strong operability, and strong development;

3. By realizing the fixed-point cruise of the UAV, the intelligent and flying, through the neural network tracking algorithm, the unmanned intelligence is achieved, thereby achieving the UAV automation intelligent flight, convenient and fast.

These and other objectives, features, and advantages of the present invention will become apparent from the following detailed description, the accompanying drawings, and the appended claims.

DETAILED DESCRIPTION OF THE PREFERRED EMBODIMENT

In order to make the objects, technical solutions and effects of the present invention, the present invention will be described in detail below with reference to the accompanying drawings. It will be appreciated that the specific embodiments described herein are intended to explain the present invention and is not intended to limit the invention.

Those skilled in the art will appreciate that the foregoing general description and the following detailed description are exemplary and illustrative embodiments of the invention, and the present invention is not intended to limit the invention.

The term "comprising", "including", "comprising" or any other variant thereof is intended to cover non-exclusive, such that the process or method including the step list includes not only those steps, but also can include unclear or such processes or methods. Similarly, without more restrictions, one or more devices or subsystems, elements, or structures or components that "contain one" do not have more restrictions, exclude other devices or other children, system or other elements or other structures or other components or other subsystems or other components or other components. In the entire manual, the phrase "in one embodiment", "in another embodiment" and the similar language may, but not necessarily, the same embodiments.

All techniques and scientific terms used herein have the same meaning as generally understood by those of ordinary skill in the art of the present invention, unless otherwise defined.

The present invention provides a method of detecting a deep learning-based UAV intelligent cruise road disease detection, UAV built-in road recognition model and road recognition model based on deep learning network, and the detection method is specifically:

The UAV is automatically flying on a predetermined route on the actual road determined by the road recognition model, and the road disease test results are obtained by the road surface disease detection model.

Specifically, the road disease detection method provided by the present invention is based on the UAV intelligent cruise, and it is used to automatically detect the predetermined route with the UAV, which uses the road recognition model to perform road identification, and then determine the flight on the normal road. No remote control is required, while using the road surface disease detection model for road disease recognition. Specifically, the UAV has a high-definition camera, and the resolution setting includes 1024*720, 1920*1080, etc., the sharpness of the shooting is high, and a certain detection requirement can be satisfied. As a preferred embodiment, the predetermined route is preset by the server; the UAV is communicatively communicated with the predetermined route data; preferably, the predetermined route can be pre-set in the UAV, or the UAV is loaded while the flight is loaded, and the present invention is not limited. In the specific operation, the road image and road disease image data are acquired by a high-definition camera, stored in the SD card. With further implementation, there is no need to set a predetermined route, just need to set the area range of cruise detection, the UAV can detect all the roads in this region, and the specific implementation principle is as described above, not doing limited.

Figure 1:
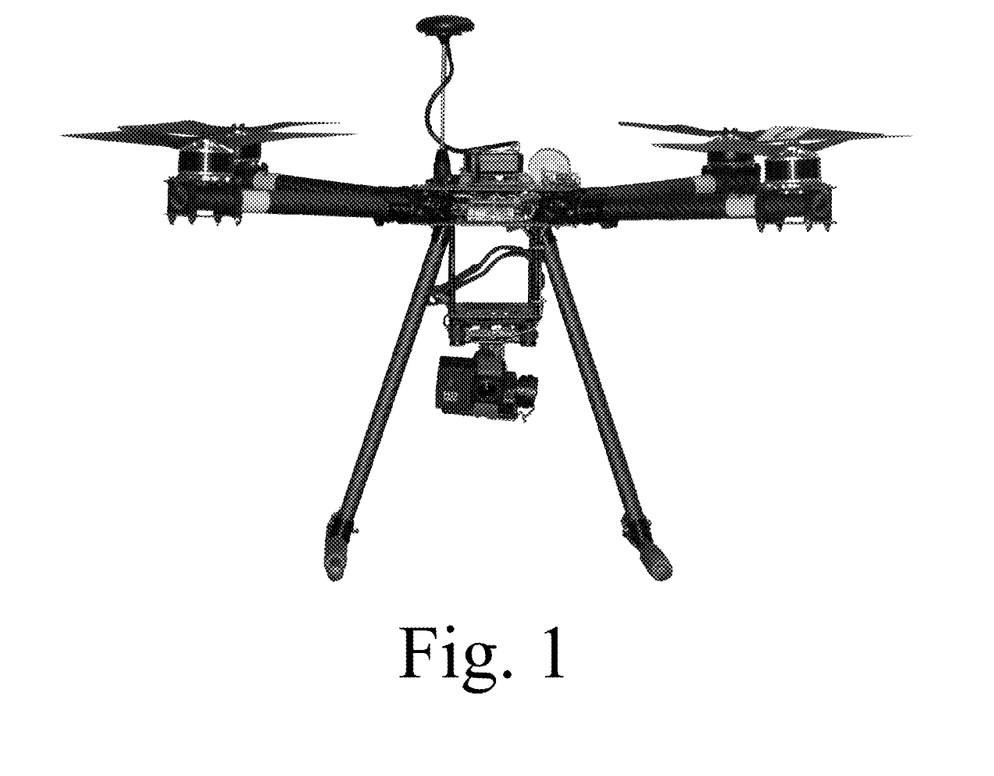
FIG. 1 is a structural diagram of the UAV provided by the present invention.

Correspondingly, please refer to FIG. 1, the present invention also provides an engineer, including the basic component 2, the camera 1, and the detection plate 3; the camera 1, the detecting plate 3 is connected to the base component 2, respectively; the detecting plate 3 is loaded with a road surface disease detection model and a road recognition model based on a depth learning algorithm, and the road surface disease detection method can be realized. The basic component 2 is a base member of the UAV, and it is possible to realize the normal operation of the UAV in the prior art, which is not limited herein, in the present embodiment, the basic component 2 further according to the detection board 3. The road information driver UAV flies along the scheduled route in the middle road recognition model.

In the present embodiment, the UAV acquires an environmental image around the UAV by the camera 1 and is delivered to the detecting plate 3 by the basic component 2; the number of the camera 1 is not limited. It is also one, or it can be arranged according to the corresponding predetermined position; the detection board 3 determines whether the current UAV is on the road, if not, drive the UAV back to the road if it is not necessary to adjust, continue to fly forward, no need to manually remote control, realizing automatic flight. It should be explained that the automatic flight is not only necessary to fly according to the established trajectory, but also guaranteed by after obtaining the environmental image by the camera 1, in the real road, fly according to the scheduled route; simultaneously determine the road surface area through the road surface disease detection model, determine whether there is a road disease in the road area, and automatically detect road diseases on the basis of automatic flight.

Figure 2:
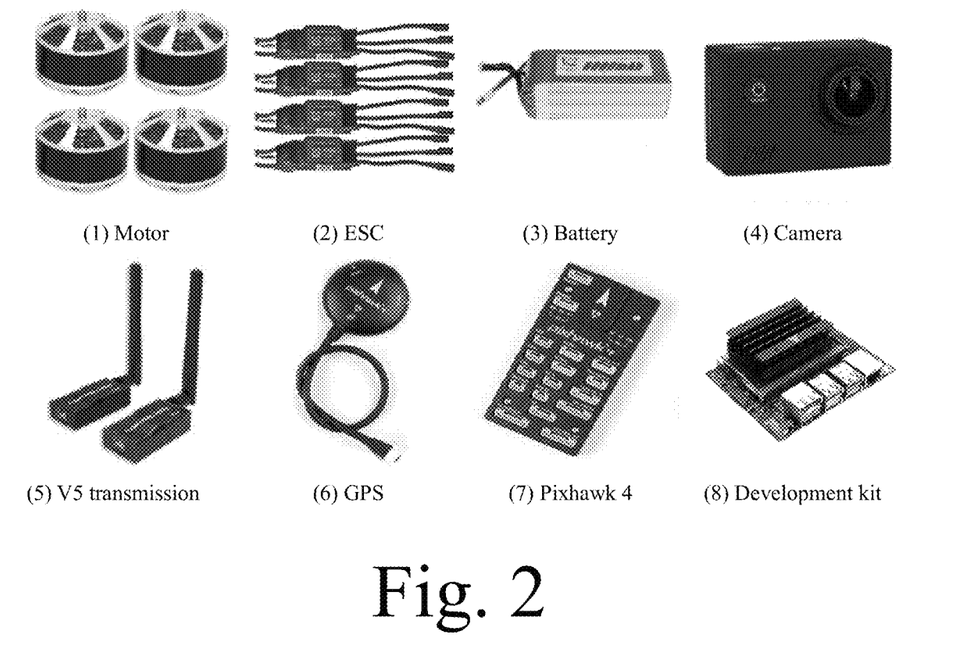
FIG. 2 is a detailed structural block diagram of the UAV provided by the present invention.

As a preferred embodiment, referring to FIG. 2, in the present embodiment, the basic component 2 includes a rack (not shown), a motor 21, an electrical tuning 22, a control panel 25, a data transmission module 23, an image transmission module 24, and an acceleration positioning device 27; wherein the electrical tuning 22, the acceleration meter 26, the positioning device 27, the detecting plate 3, and the control panel 25 are integrated on the rack; the motor 21 is connected to the electrical tuning 22; the camera 1 is connected to the image transmission module 24, the image transmission module 24, and the data transmission module 23 are connected to the detection plate 3, respectively. The electrical tuning 22 is configured to drive the motor 21 according to an instruction of the control panel 25, and drive the flight fan blade; the control panel 25 drives the normal operation of the UAV system; the data transmission module 23 is used to connect to the host computer, transmit the communication data transmitted by the control board 25, receive communication data transmitted by the host computer, realize a specific connection of the UAV and the host computer; the image transmission module 24 is used to shoot the camera 1, the image is transmitted to the detecting plate 3 for processing and recognition; the detecting plate 3 is identified by the image captured by the camera 1, transmitting the identification information to the control panel 25 for the control panel 25 to control reference data of the UAV flight, such as identifying the side of the road surface in the right side of the UAV flight direction, driving the position of the UAV to adjust the position to the right side; the positioning device 27 acquires positioning information, when the detection board 3 when there is a road surface disease in the road, the specific coordinate position of the road surface disease is determined, accurate and fast.

Specifically, the basic component 2 is the basic member required for the normal operation of the UAV, which can be used in the art, and the preferred implementation list is listed in Table 1 (including components and corresponding models):

TABLE 1

UAV accessories parameter table

| Assembly | model |
| --- | --- |
| | ZD680PRO |
| | YH4120 |
| frame | ZD680PRO |
| Motor 21 | YH4120 |
| Electric tonary 22 | Yingle day 40A |
| Flight control (control board 25) | Pixhawk 4 |
| GPS (positioning device 27) | M8N |
| Data transmission station (data transmission module 23) | V5 (1500 meters from the transmission distance) |
| Graphic Module (Image Transmission Module 24) | TS832 (transmission distance 2000 meters) |
| Camera (camera 1) | Mountain dog sports camera |
| power supply | 6S 8000 mAh battery |
| remote control | Le Di AT9S remote control |

Figure 6:
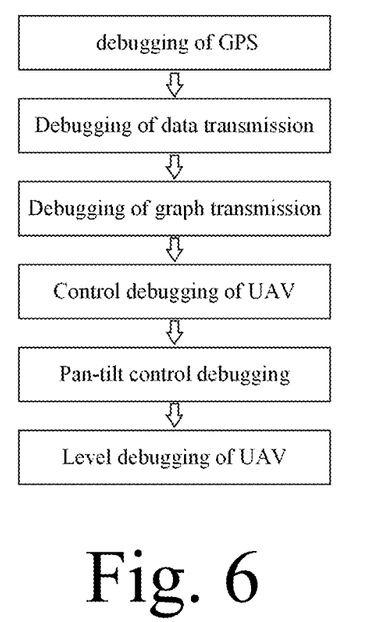
FIG. 6 is a flowchart of an embodiment of the assembly and debugging of the unmanned aerial vehicle provided by the present invention.
Figure 7:
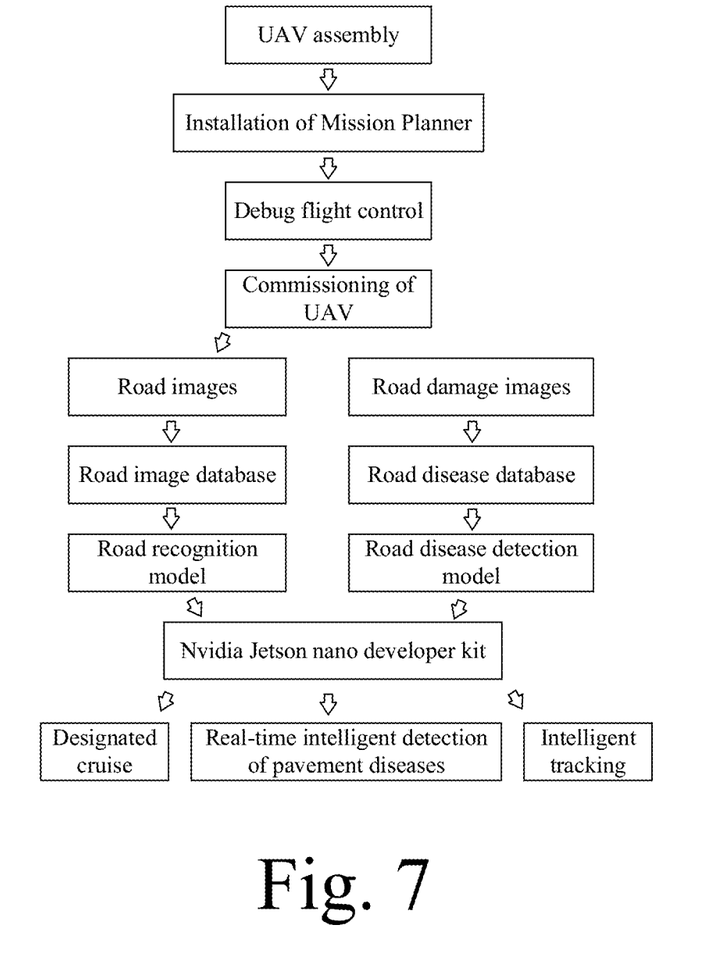
FIG. 7 is a structural block diagram of the road disease detection system provided by the present invention.

Referring to FIG. 6, the present invention provides a depth study and UAV intelligent cruise road surface disease detection system, debugging and assembly operations contain the following steps:

S1: after the UAV assembly is performed according to the above components, after assembling the UAV, the UAV body is 2.3 kg, resistance to the 5-level wind, when there is no interference in the flight area, no obstacle, no obstruction, flight 2000 meters, with self-organized flight, fixed-point hover, one-click return, and intelligent target tracking function, thereby ensuring that the UAV can safely and reliably apply intelligent detection of roads.

Before working properly, it is necessary to assemble the UAV. Of course, before assembling, the UAV unlock check should be performed, preventing the UAV from being loses control after power-on, threats to the surrounding personal safety. By default, the UAC enables the integrated security switch of the GPS module. After enabling, Pixhawk 4 will lock the UAV. The specific assembly debugging process is:

S21: installing the Mission Planner software, connecting portable notebooks with Pixhawk 4 flight control modules and GPS, using Mission Planner to burn, write and upgrade control software for the UAV; specifically, placing the microcontroller of the PixHawk 4 flight control module has 2 MB of flash memory and 512 KB of RAM, making more complex algorithms and models can be implemented on the automatic driver. The Pixhawk 4 flight control module has a separate shock absorber and heating resistor to achieve a certain degree of damping and temperature compensation. And, Pixhawk 4 has a gyroscope, acceleration meter 26, a level, and other built-in modules, calibration through the Mission Planner (version 1.3.62), can ensure smooth moving.

S22: debugging, including accelerometer 26 calibration, compass calibration, and GPS calibration; wherein the GPS module model is M8N, the module integrates GPS with compass, security switches, buzzers and LED integration, connected to Pixhawk 4 GPS module ports make it as far as possible from other electronic devices, reducing interference. The GPS positive direction should be in the positive direction of the Pixhawk 4 flight control module, and the direction mark is facing the front of the UAV. The gyroscope calibration is performed by Mission Planner (1.3.62 version) and unlock testing and out-of control protection settings to ensure the safety of UAVs.

S23: by calibrating and debugging the remote control, the UAV fails in accordance with the designated orientation, set three flight modes, realize self-stable flight, fixed-point hover, and one-button return function.

S24: calibrating the V5 Digital Module, delivers a fixed-point flight of the UAV by downloading the Mission Planner ground control station in a portable computer or downloading a flying fish ground station app on a smartphone, wherein FIG. 2 shows the control map of Mission Planner, by specifying a flight height, controlling, setting a hover time, can make the UAV to fly according to the designated track, thereby improving the intelligence of the detection of UAV road disease;

S25: adjusting the map transmission station, so that the map display screen displays the amount of unmanned electrical voltage to prevent the UAV from falling due to low voltage and electricity during flight.

After assembly debugging, you need to perform performance debugging, specifically:

S31: The control debugging of the UAV refers to whether the remote control is controlled by the remote control to control the direction of the UAV rotation in the UAV fan.

S32 PTZ control commissioning includes debugging of horizontal and lateral rotation and self-stable debugging;

S33: The level of the UAV is referred to as a macro-mounted slight flight, and the UAV can be self-organized.

As a preferred embodiment, before the detecting method is performed, the road recognition model, the road surface disease detection model, the depth learning network of the road surface disease detection model, the road surface disease detection model, the basic model is trained, and the optimal road recognition model is obtained, and the road surface disease detection model is loaded into the UAV.

Specific training methods of the invention are not limited, and can be used in the art of training commonly used in the art. The road surface disease is divided into three types: cracks, pit grooves, and cracks, forming an image library according to each disease type, and further training for each disease separately. The present invention provides a training operation, specifically:

S41: the screening of images refers to a clear data set in accordance with certain criteria; the criterion of image screening is: (1) the disease position should be as close as possible to the center; (2) the disease should be clear in the visual range of human eyes; (3) image should contain factors such as strong light, shadow and noise; (4) the image should contain various shooting angles.

S42: the clipping of the image refers to the clipping of the picture to a unified size, easy to mark and post-processing; the area and type labeled here, the corresponding post-processing is the image processing algorithm commonly used in the art, the present invention is not limited.

S43: the label of the image refers to a rectangular box by a MATLAB program, labeled a disease on a category as a rectangular box;

S44: the format conversion of the image refers to the transfer of the label information into the MXL format, which constitutes the UAV road image database and road disease image database.

S45: UAV road image database and road disease image database are divided into training set, verification set and test set according to the proportion of 6:2:2, respectively.

S46: in high-performance computer terminal training UAV road image and road disease image, through multiple debugging, the optimal road recognition model and road disease detection model; debugging hypervisor should include initial learning rate, total number of total generations, Motto coefficient, weight decay, etc.

S47: transplanting the optimal road recognition model and road domain detection model to NVIDIA Jetson Nano development board, and installing the development board on the UAV; NVIDIA Jetson NANO development board should be equipped with Tensorrt and DeepStream model acceleration framework.

S48: on the actual road, fixed-point cruise detection and intelligent heel detection, adjusting the test results, and determining whether the surface disease test results reach the expected goal. Specifically, the evaluation index of the detection result is: PR curve, F1 score, accuracy, detection efficiency, and the like.

Specifically, the present invention mounts the NVIDIA Jetson Nano development board on the UAV, directly detects the road disease video, eliminating the step of transmitting video data back to the computer terminal, solves the problem of unstable transmission signal, and realizes road disease Real-time detection.

Figure 3:
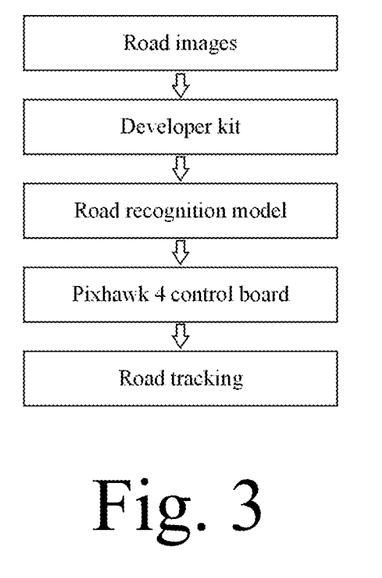
FIG. 3 is a flow chart of the intelligent follow-up provided by the present invention.

As a preferred embodiment, referring to FIG. 3, in the present embodiment, the operation mode of the UAV includes intelligent and flying, the specific steps are:

getting an environment picture; getting the picture here is done through the camera 1 on the UAV, please refer to the above content;

using the road recognition model to determine the road mark;

getting a predetermined route, driving the UAV to fly along the road surface on the predetermined route. Specifically, intelligent follow-up is mainly flying along the logo of the road. It does not require manual control, you can realize the automatic flight of the road to the road complicated and more arc line, convenient and fast, cooperating with the UAV Key to return function, etc., realize automatic cruise detection within a certain route; wherein specifically, in the operating mode of intelligent confection, the route recognition model will focus on identifying the flag on the road surface, transmitting the road surface flag data into the control panel 25 in the UAV, the control board 25 is controlled according to the road sign data; the UAV is normal flight, and the control method of the control board 25 is not limited.

Figure 4:
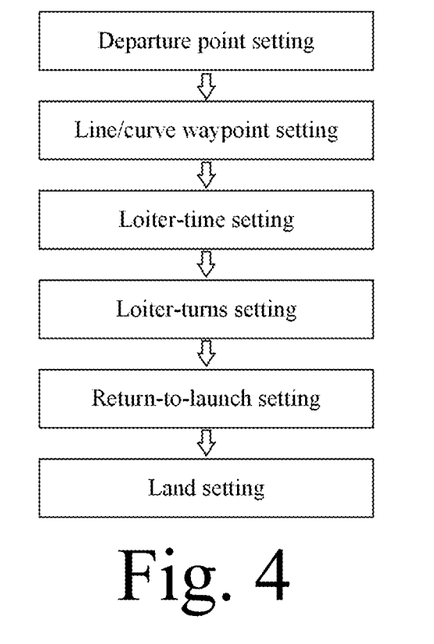
FIG. 4 is a flow chart of the fixed-point cruise provided by the present invention.
Figure 5:
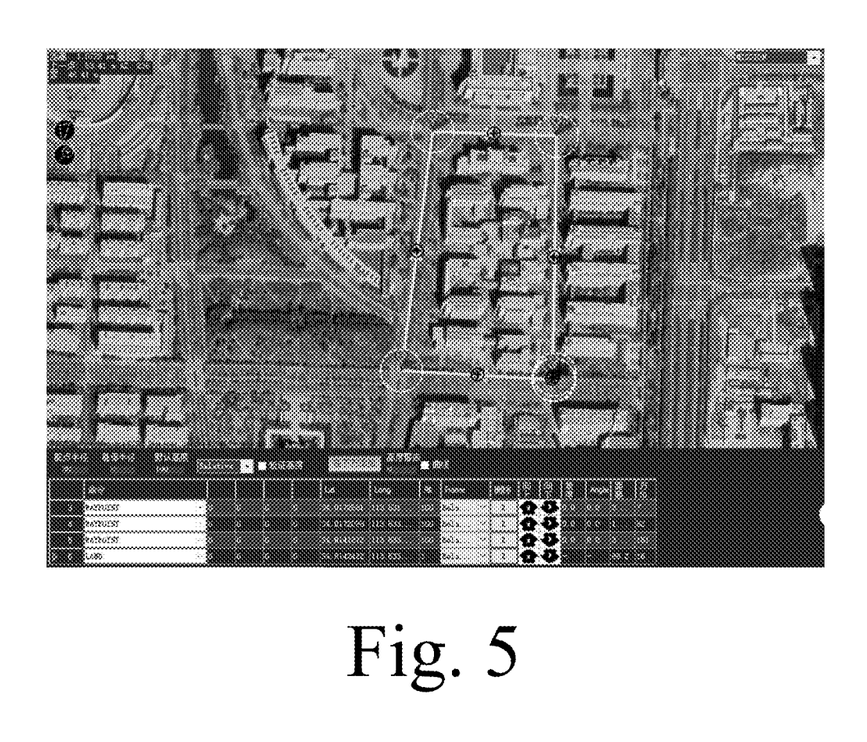
FIG. 5 is a map display diagram of the fixed-point cruise operation provided by the present invention.

As a preferred embodiment, referring to FIGS. 4 and 5, in the present embodiment, the operation mode of the UAV includes a fixed point cruise, and the specific steps are:

determining several key positions of the scheduled route; wherein the specific, fixed-point cruise mode is more suitable for road sections, as long as the key position is set to a critical position, you can realize the UAV along the real road section, which is fast and convenient;

passing the UAV sequentially by a critical position in accordance with the predetermined order; wherein through FIG. 5, it can be found that the road segment between the two critical positions between the UAV can be realized as long as it is possible to determine a limited number of critical positions, and of course the road segment is the best, the UAV workload is small, followed by further operation, as in the rectangular road map in FIG. 5, only need to determine the critical position (2) and the critical position (4), then determine the range to retrieve, you can implement all the roads in this area; and cruise detection is convenient and fast.

Accordingly, the present invention also provides a road surface disease detection system using the above-mentioned UAV, including interactive end and UAV, the UAV is in communication with the interactive end. Preferably, the interactive end is a computer or a mobile phone, further, the interaction end can be a cloud station (cloud platform) or a remote server, i.e., set a predetermined route to the UAV over the network, the human machine performs the above test operation.

Accordingly, the present invention also provides a readable medium for storing a computing software, which is performed when executed by the processor, completes the road disease detection method described in the above. Specifically, the readable medium may be independent, or may be in a certain electronic device, such as the UAV provided by the present invention, to achieve the road surface detection method.

It will be appreciated that one of ordinary skill in the art can be equivalent or changed according to the technical solutions and inventive concepts of the present invention, while all of these changes or replacements should belong to the scope of the appended claims.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for detecting road diseases by intelligent cruise via an unmanned aerial vehicle (UAV), wherein a road disease detection model and a road recognition model based on deep learning network are built in the UAV, wherein the method specifically comprises a step of:
  automatically flying the UAV on a predetermined route on the actual road determined by the road recognition model, and obtaining road disease test results by the road surface disease detection model.

2. The method for detecting road diseases by intelligent cruise via the UAV, as recited in claim 1, wherein the predetermined route is preset by the server; the UAV is communicating with the server to acquire the predetermined route data.

3. The method for detecting road diseases by intelligent cruise via the UAV, as recited in claim 1, wherein an operation mode of the UAV comprises intelligent flying, wherein the specific steps are:
  getting an environmental image;
  using the road recognition model to determine the road mark; and
  getting a predetermined route, drive the UAV to fly along the road surface on the predetermined route.

4. The method for detecting road diseases by intelligent cruise via the UAV, as recited in claim 1, wherein the operation mode of the UAV includes a fixed point cruise, and the specific steps are:
  determining several key locations of the scheduled route; and
  sequentially passing a critical position in accordance with the predetermined order by the UAV.

5. An unmanned aerial vehicle (UAV), comprising: a basic component, cameras and detection plates; wherein the camera, the detecting plates are connected to the basic component; the detection plate is loaded with a depth learning algorithm's road disease detection model and road recognition model, and can implement the road disease detection method as recited in claim 1.

6. The UAV as recited in claim 5, wherein the basic component comprises a rack, a motor, an electrical tone, a control board, a data transmission module, an image transmission module, an accelerometer, a positioning device; the electrical tone, the accelerometer, the positioning device, the detecting plate, respectively connect to the control board, integrated is mounted on the frame; the motor is connected to the electrical tone; the camera is connected to the image transmission module, the image transmission module and the data transmission module is respectively connected to the detection board.

7. A road surface disease detection system using the drone according to claim 1, comprising an interactive end and an UAV, wherein the UAV is in communication with the interactive end.

8. The road disease detection system by UAV intelligent cruise based on depth-learning, as recited in claim 7, wherein the interactive end is a computer or a mobile phone.

* * * * *